US012270248B2

(12) United States Patent
Pentecost

(10) Patent No.: US 12,270,248 B2
(45) Date of Patent: Apr. 8, 2025

(54) PET ACCESS TUNNEL AND METHOD OF INSTALLATION

(71) Applicant: Marc Pentecost, Valparaiso, IN (US)

(72) Inventor: Marc Pentecost, Valparaiso, IN (US)

( * ) Notice: Subject to any disclaimer, the term of this patent is extended or adjusted under 35 U.S.C. 154(b) by 0 days.

(21) Appl. No.: 18/599,981

(22) Filed: Mar. 8, 2024

(65) Prior Publication Data

US 2024/0301748 A1 Sep. 12, 2024

Related U.S. Application Data

(60) Provisional application No. 63/489,087, filed on Mar. 8, 2023.

(51) Int. Cl.
*E06B 7/32* (2006.01)
*E06B 9/00* (2006.01)

(52) U.S. Cl.
CPC .......... *E06B 7/32* (2013.01); *E06B 2009/002* (2013.01)

(58) Field of Classification Search
CPC ..... E06B 7/32; E06B 9/04; E06B 9/02; E06B 2009/002; E06B 2003/7057
See application file for complete search history.

(56) References Cited

U.S. PATENT DOCUMENTS 2,758,646 A * 8/1956 Johnson .................... E06B 7/32 160/90
3,985,174 A * 10/1976 Bricker .................... E06B 7/32 160/180
4,754,797 A * 7/1988 Sronce .................... E06B 7/32 160/354
4,839,989 A * 6/1989 McConnell .................... E06B 7/30 49/394
5,161,328 A * 11/1992 Traue .................... E06B 7/32 49/171
5,269,097 A * 12/1993 Davlantes .................... E05C 9/00 49/169
5,287,654 A * 2/1994 Davlantes .................... E06B 7/32 49/169
5,406,748 A * 4/1995 Davlantes .................... E06B 7/32 49/245
5,735,079 A * 4/1998 Davlantes .................... E06B 7/32 49/504
5,782,037 A * 7/1998 Davlantes .................... E06B 7/32 49/62
6,681,524 B1 * 1/2004 Tillson .................... E06B 7/32 160/180

(Continued)

*Primary Examiner* — Justin B Rephann
(74) *Attorney, Agent, or Firm* — Hartman Global IP Law; Gary M. Hartman; Domenica N. S. Hartman

(57) ABSTRACT

A pet access tunnel and method of installing a pet access tunnel in and through interior walls of a building structure. The pet access tunnel includes a first interior flange configured to be installed in a wall opening through the wall at a first side of the wall, a second interior flange configured to be installed in the wall opening through the wall at a second side of the wall, a first door flange configured to be installed in the central opening of the first interior flange, a second door flange configured to be installed in the central opening of the second interior flange, a wall spacer having a central opening and configured to be coupled to the first and second door flanges, and at least one door movably mounted to at least one of the first and second door flanges.

10 Claims, 14 Drawing Sheets

(56) References Cited

U.S. PATENT DOCUMENTS

| | | | | |
|---|---|---|---|---|
| 7,913,454 | B2 * | 3/2011 | Sullivan | E06B 7/32 160/180 |
| 8,434,264 | B2 * | 5/2013 | Bosserdet, Jr. | E06B 7/32 49/168 |
| 8,826,594 | B2 * | 9/2014 | Graves | E05B 47/0012 49/169 |
| 9,464,476 | B2 * | 10/2016 | Ward | E06B 5/00 |
| 9,926,737 | B2 * | 3/2018 | Wanjohi | A47G 29/126 |
| 10,750,714 | B2 * | 8/2020 | Stricklin | A01K 1/035 |
| 10,941,611 | B2 * | 3/2021 | Stricklin | E05B 65/06 |
| 11,702,885 | B1 * | 7/2023 | Harrington | A01K 29/00 49/31 |
| 12,144,448 | B1 * | 11/2024 | McCollum | A47G 29/28 |
| 2014/0190081 | A1 * | 7/2014 | Wanjohi | A47G 29/126 49/504 |
| 2019/0234138 | A1 * | 8/2019 | Zacher | E06B 7/32 |
| 2023/0417099 | A1 * | 12/2023 | Harrington | E06B 1/6061 |
| 2024/0151099 | A1 * | 5/2024 | Frost | E06B 3/485 |

* cited by examiner

PET ACCESS TUNNEL AND METHOD OF INSTALLATION

CROSS-REFERENCE TO RELATED APPLICATIONS

This application claims the benefit of U.S. Provisional Application No. 63/489,087, filed Mar. 8, 2023, the contents of which are incorporated herein by reference.

BACKGROUND OF THE INVENTION

The present invention generally relates to pet access means for building structures. The invention particularly relates to pet access tunnels configured to be installed in and through walls, such as interior or exterior walls of houses or other private or commercial buildings.

Pet access into and within building structures typically relies on the use of doors to provide access to pets into and between rooms. These access points are limiting and necessitate installations at points within a room that might not be visually appealing.

In view of the above, it would be desirable if an improved pet access tunnel and method of installation were available that was capable of being installed in a variety of locations within a room and configured to be done so in a discreet manner.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, a pet access tunnel and a method of installing the pet access tunnel in and through interior walls of a building structure.

According to a nonlimiting aspect of the invention, a pet access tunnel includes a first interior flange configured to be installed in a wall opening through the wall at a first side of the wall, a second interior flange configured to be installed in the wall opening through the wall at a second side of the wall, a first door flange configured to be installed in the central opening of the first interior flange, a second door flange configured to be installed in the central opening of the second interior flange, a wall spacer having a central opening and configured to be coupled to the first and second door flanges, and at least one door movably mounted to at least one of the first and second door flanges.

According to another nonlimiting aspect of the invention, a method of installing a pet access tunnel in and through a wall includes forming a wall opening in the wall by cutting first and second wall holes at first and second sides of the wall, installing first and second interior flanges in the first and second wall holes, installing a first door flange and a wall spacer within a central opening of the first interior flange at the first side of the wall, and installing a second door flange within a central opening of the second interior flange at the second side of the wall.

According to another nonlimiting aspect of the invention, a kit is provided for installing a pet access tunnel. The kit includes a template having a perimeter for identifying the boundaries of a wall opening at first and second sides of a wall. The template has a central boss with a hole therethrough, and an alignment nail receivable in the hole of the central boss for creating the alignment hole.

Technical aspects of systems and methods having features as described above preferably include the ability to install the device within an existing wall in a building structure at a desired location in a discreet manner.

These and other aspects, arrangements, features, and/or technical effects will become apparent upon detailed inspection of the figures and the following detailed description.

DETAILED DESCRIPTION OF THE INVENTION

Figure 1B:
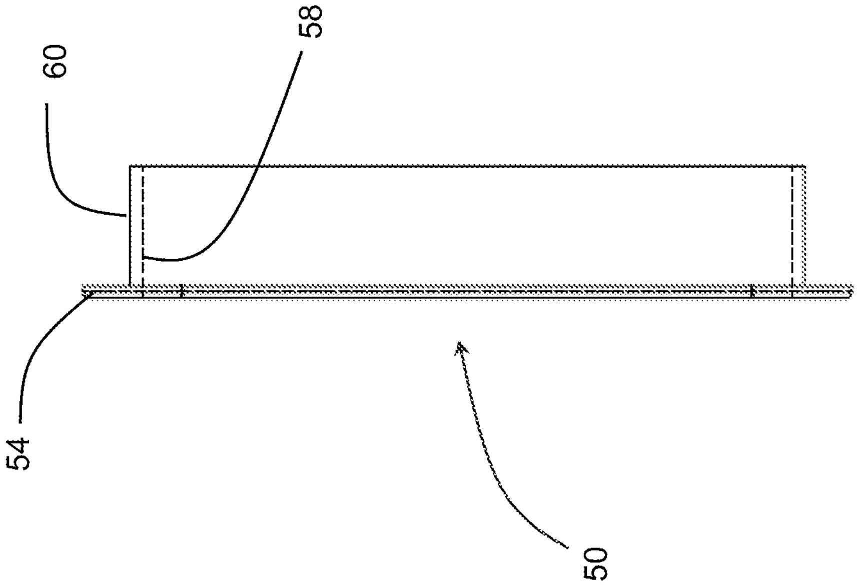
FIGS. 1A and 1B schematically represent front and side views, respectively, of an interior flange as a component of a pet access tunnel of the present invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) depicted in the drawings. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated. Therefore, the appended claims, and not the detailed description, are intended to recite what at least provisionally are believed to be aspects of the invention, including certain but not necessarily all of the aspects and alternatives described in the detailed description.

The following disclosure describes various aspects of nonlimiting embodiments of a pet access tunnel, components of the pet access tunnel, and installation of the pet access tunnel that are represented in FIGS. 1 through 16C. To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of the lathing strip during its use and/or as represented in the drawings. All such relative terms are useful to describe the illustrated embodiment(s) but should not be otherwise interpreted as limiting the scope of the invention.

Figure 1A:
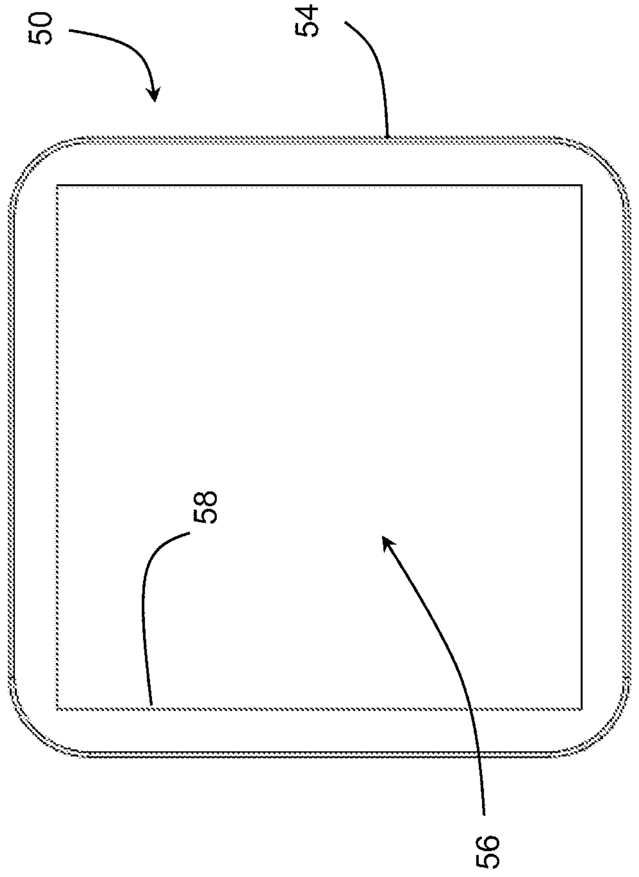

FIGS. 1A and 1B schematically represent an interior flange 50. The interior flange 50 is defined by an inside sidewall 58 and outside sidewall 60, configured in an extruded rectangular shape. A rim 54 extends around the perimeter of the sidewalls 58 and 60. The rim 54 extends perpendicular to the sidewalls 58 and 60. Together the rim 54, inside sidewall 58, and outside sidewall 60 define a central opening 56.

Figure 2B:
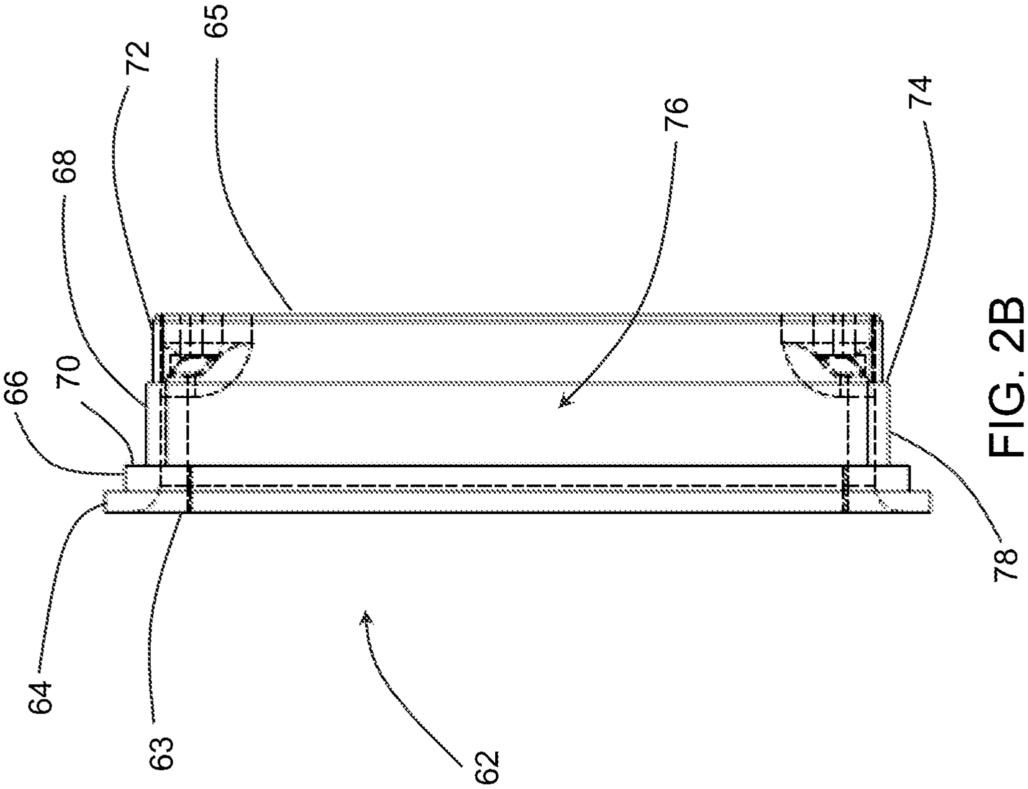
FIGS. 2A and 2B schematically represent front and side views, respectively, of a door flange as a component of the pet access tunnel.
Figure 2A:
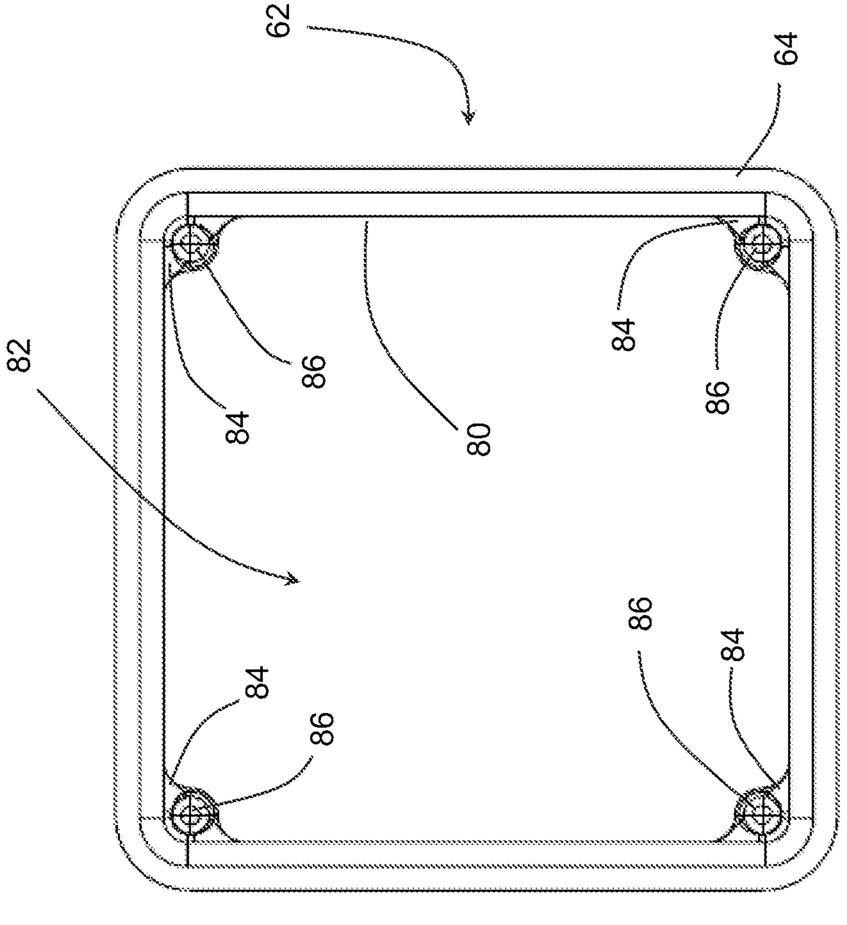

FIGS. 2A and 2B schematically represent a door flange 62. The door flange 62 is generally shaped as an extruded rectangle. The door flange 62 includes a first end 63 and a second end 65. A lip 64 extends around the outermost perimeter of the door flange 62. A rim 66 is directly adjacent to the lip 64. A first side wall 70 connects the rim 66 to a first ledge 68. A second side wall 74 connects the first ledge 68 to the second ledge 72. Each of the rim 66, first ledge 68, and second ledge 72 form an outside wall 78 and inside wall 80, that extend around a central opening 82. The central opening 82 of the door flange 62 includes internal tabs 84. The internal tabs 84 house attachment bores 86. The attachment bores 86 are through holes from the first side 63 through to the second side 65 of the door flange 62.

Figure 3B:
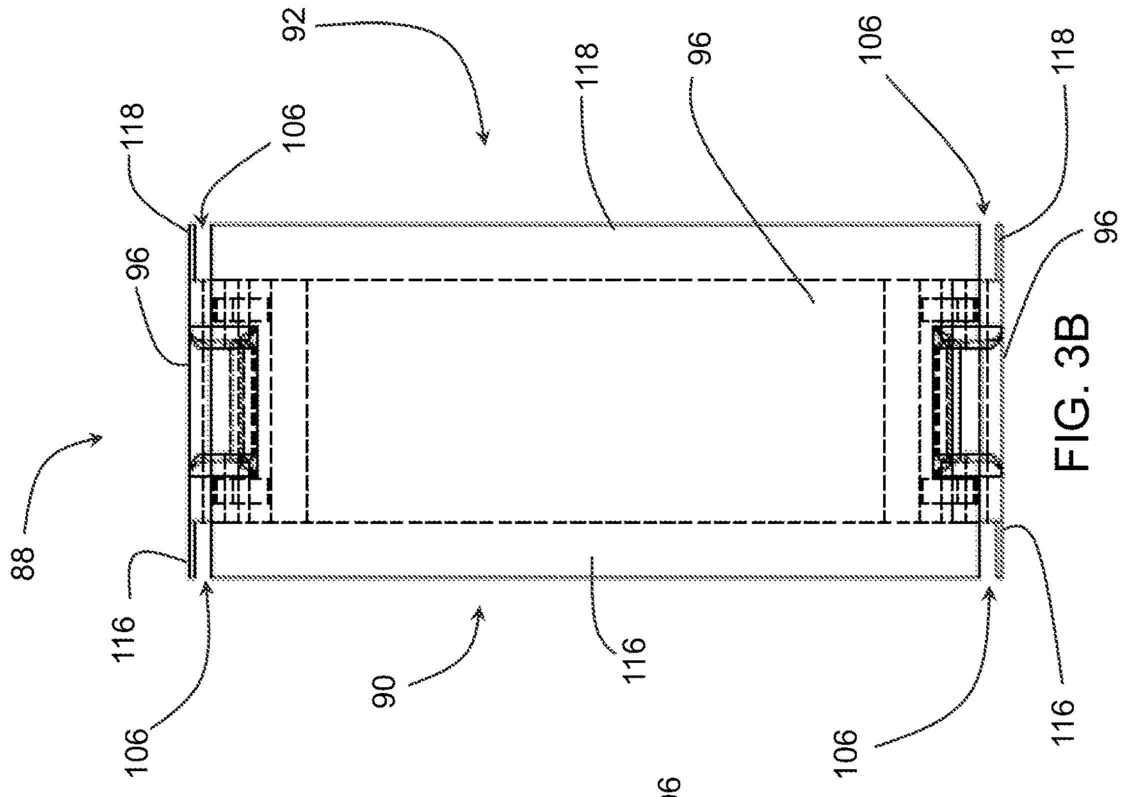
FIGS. 3A and 3B schematically represent front and side views, respectively, of a wall spacer as a component of the pet access tunnel.
Figure 3A:
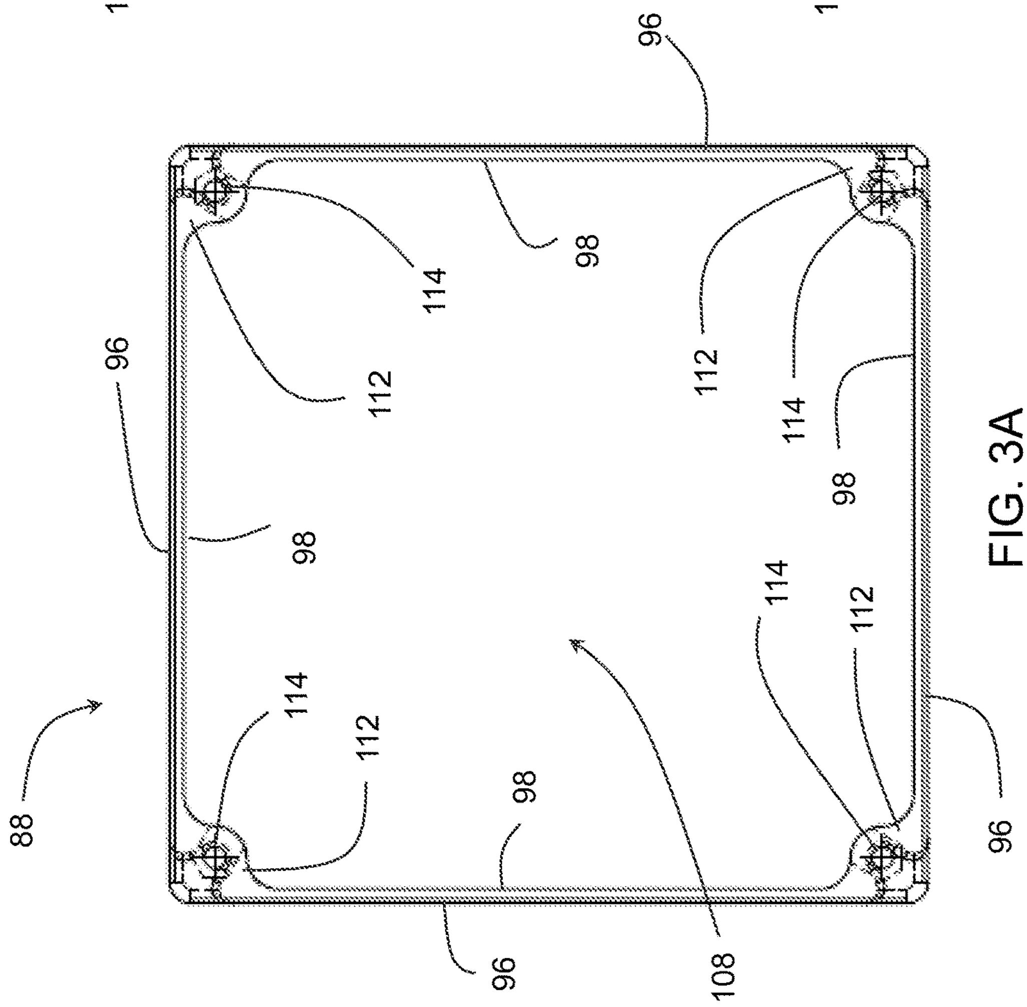

FIGS. 3A and 3B schematically depict a wall spacer 88. The wall spacer 88 is also generally shaped as an extruded rectangle. The wall spacer 88 includes a first axial end 90 and a second axial end 92. The wall spacer 88 generally includes outside walls 96 and inside walls 98. The inside walls 96 define a central opening 108. The central opening 108 includes internal tabs 112 located along the inside wall 98. The internal tabs 112 house attachment bores 114. The attachment bore 114 are through holes from the first axial end 90 through to the second axial end 92 of the wall spacer. These attachment bores 114 are configured to accept a fastener to attach the wall spacer 88 to the door flange 62. The first axial end 90 includes a first side receiving flange 116 and the second axial end 92 includes a second side receiving flange 118. A gap 106 exists between the ends of the first side receiving flange 116 and second side receiving flange 118.

Figure 4B:
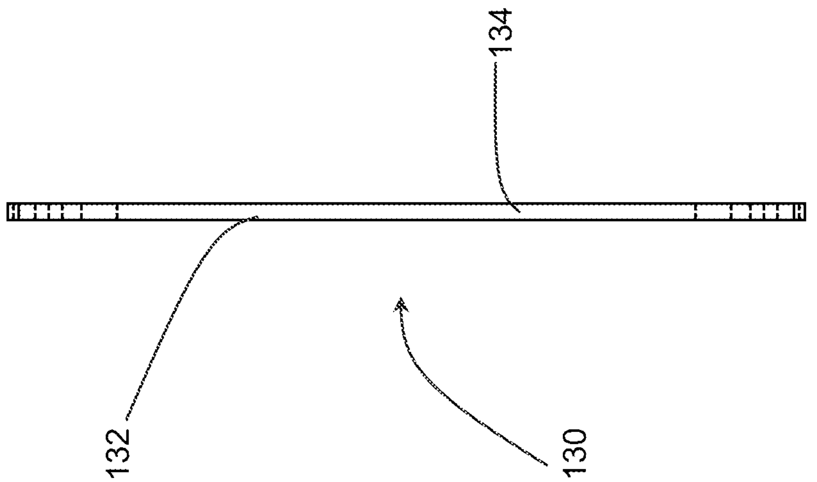
FIGS. 4A and 4B schematically represent front and side views, respectively, of a flange spacer as a component of the pet access tunnel.
Figure 4A:
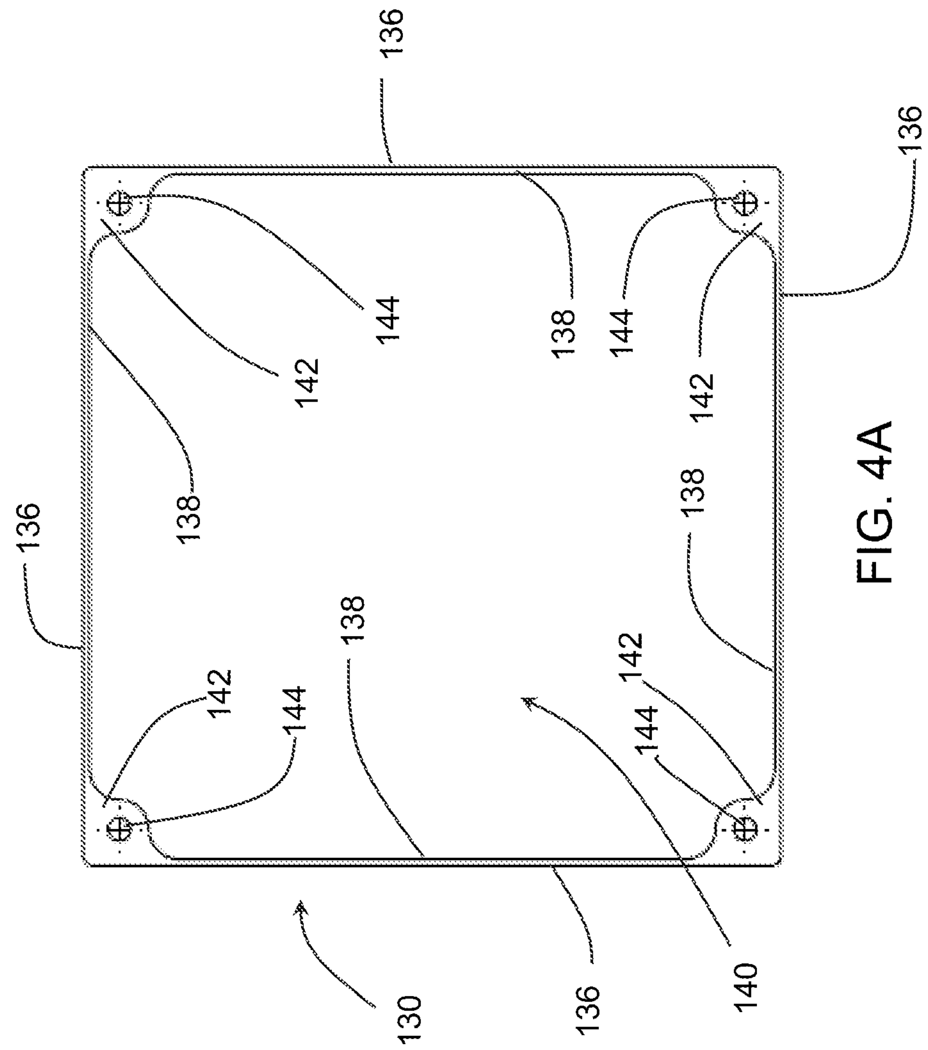

FIGS. 4A and 4B schematically represent a flange spacer 130. The flange spacer 130 is sized and shaped to correspond to the size and shape of the door flange 62 and wall spacer 88. The flange spacer 130 includes a first end 132 and a second end 134. External sidewalls 136 and internal sidewalls 138 define the rectangular shape of the flange spacer 130 and form the central opening 140. Internal tabs 142 reside at the corners of the central opening 140. The internal tabs 142 include attachment bores 144 configured to accept a fastener.

Figure 5:
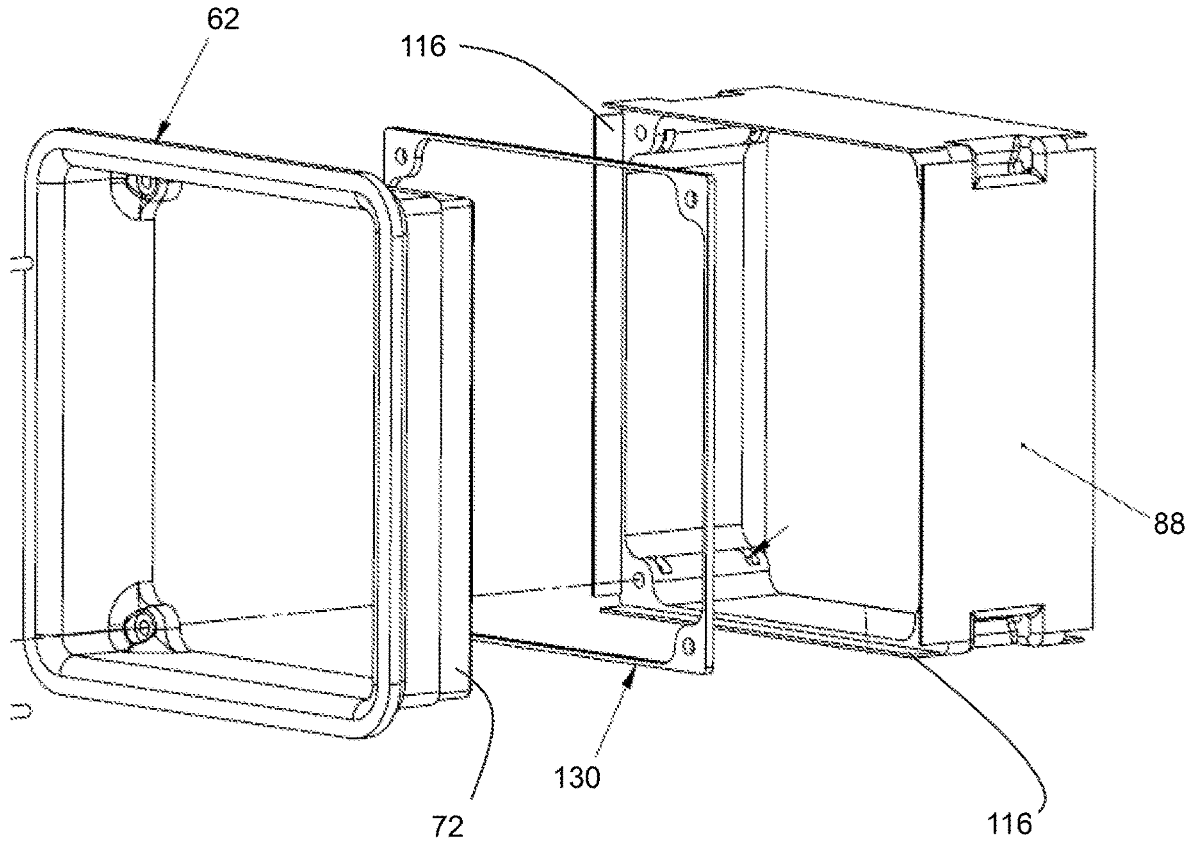
FIG. 5 schematically represents an exploded perspective view of the door flange, flange spacer, and wall spacer as depicted in FIGS. 2A through 4B.

FIG. 5 schematically depicts an exploded perspective of the door flange 62, the flange spacer 130, and the wall spacer 88. The flange spacer 130 is configured to couple to the door flange 62 by sliding over the second ledge 72 and abutting the second wall 74 of the door flange 62. The wall spacer 88 is configured to couple to the door flange 62 by engaging the first side receiving flanges 116 with the second ledge 72 of the door flange 62.

Figure 6:
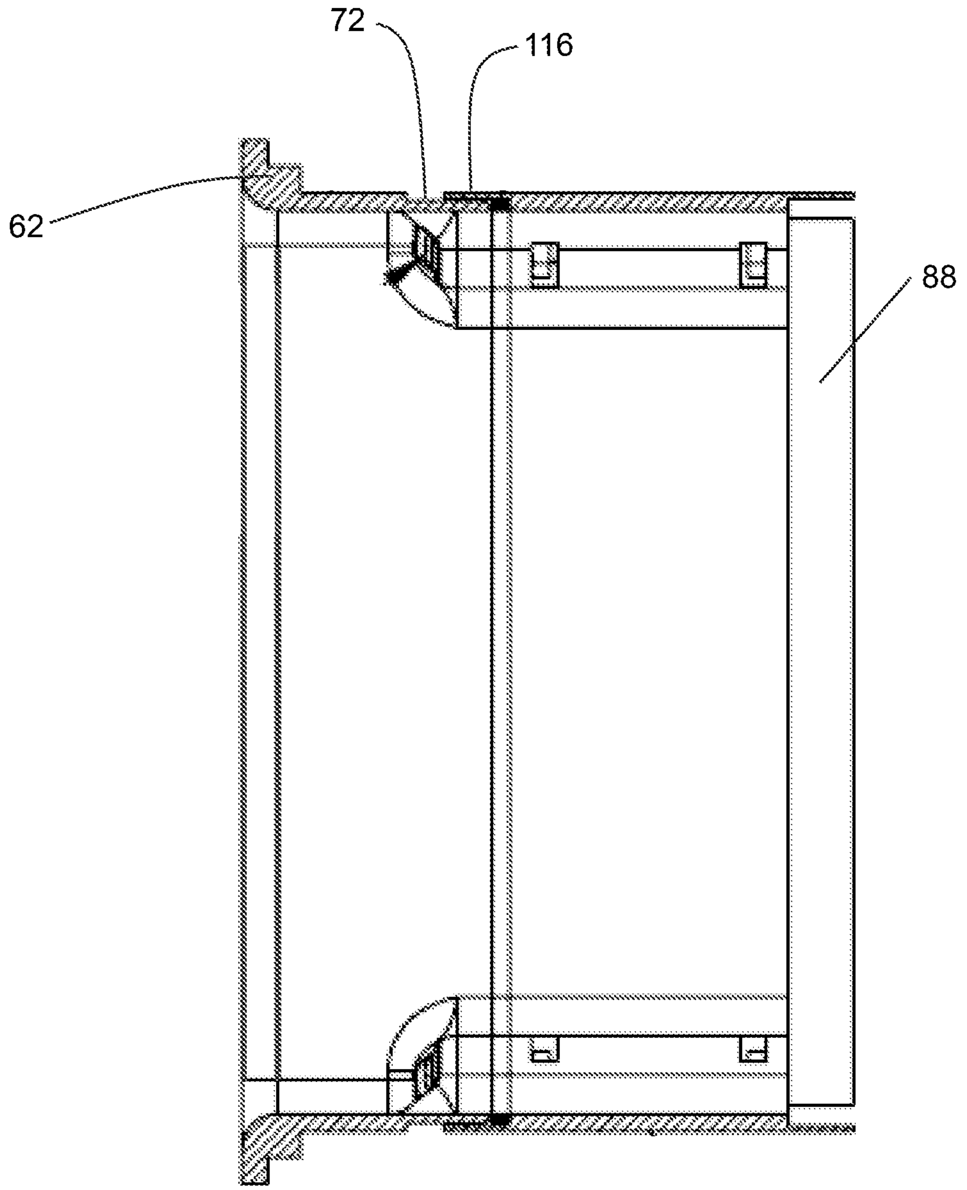
FIG. 6 schematically represents a sectioned assembled side view of the door flange and wall spacer.

FIG. 6 schematically depicts a sectioned side view of the door flange 62 and the wall spacer 88 connected. In this configuration the flange spacer 130 is not used. As can be seen, the wall spacer 88 is coupled to the door flange 62 by engaging the first side receiving flanges 116 with the second ledge 72 extending about the central opening 82 of the door flange 62.

Figure 7:
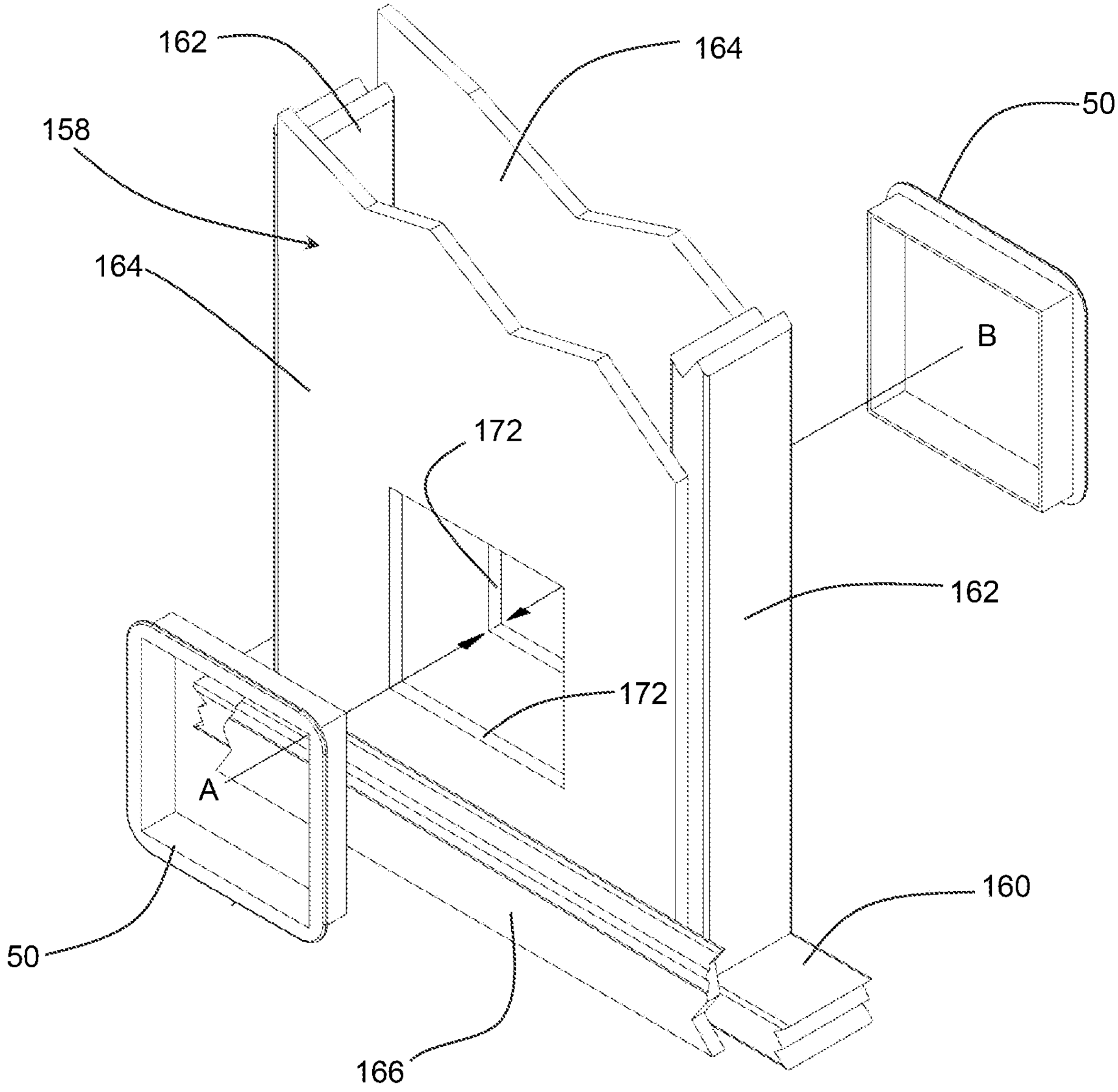
FIG. 7 schematically represents a top perspective view of the interior flange of FIGS. 1A and 1B to be installed in a wall system.

FIG. 7 schematically represents the installation of the interior flanges 50 of the pet access tunnel into a wall system 158. The wall system 158 includes a sill plate 160 with studs 162 extending vertically therefrom. Wallboards 164 are placed on each side of the studs 162. A baseboard 166 is depicted as being at the base of the wall system 158. First and second wall holes or openings 172 are found on a first side, side A, and second side, side B of the wallboard 164 on each side of the wall system 158. A first interior flange 50 is set to be installed from first side A of the wall system 158 and into the opening 172 and a second interior flange 50 is set to be installed from side B and into opening 172 on the second side of the wall system 158.

Figure 8:
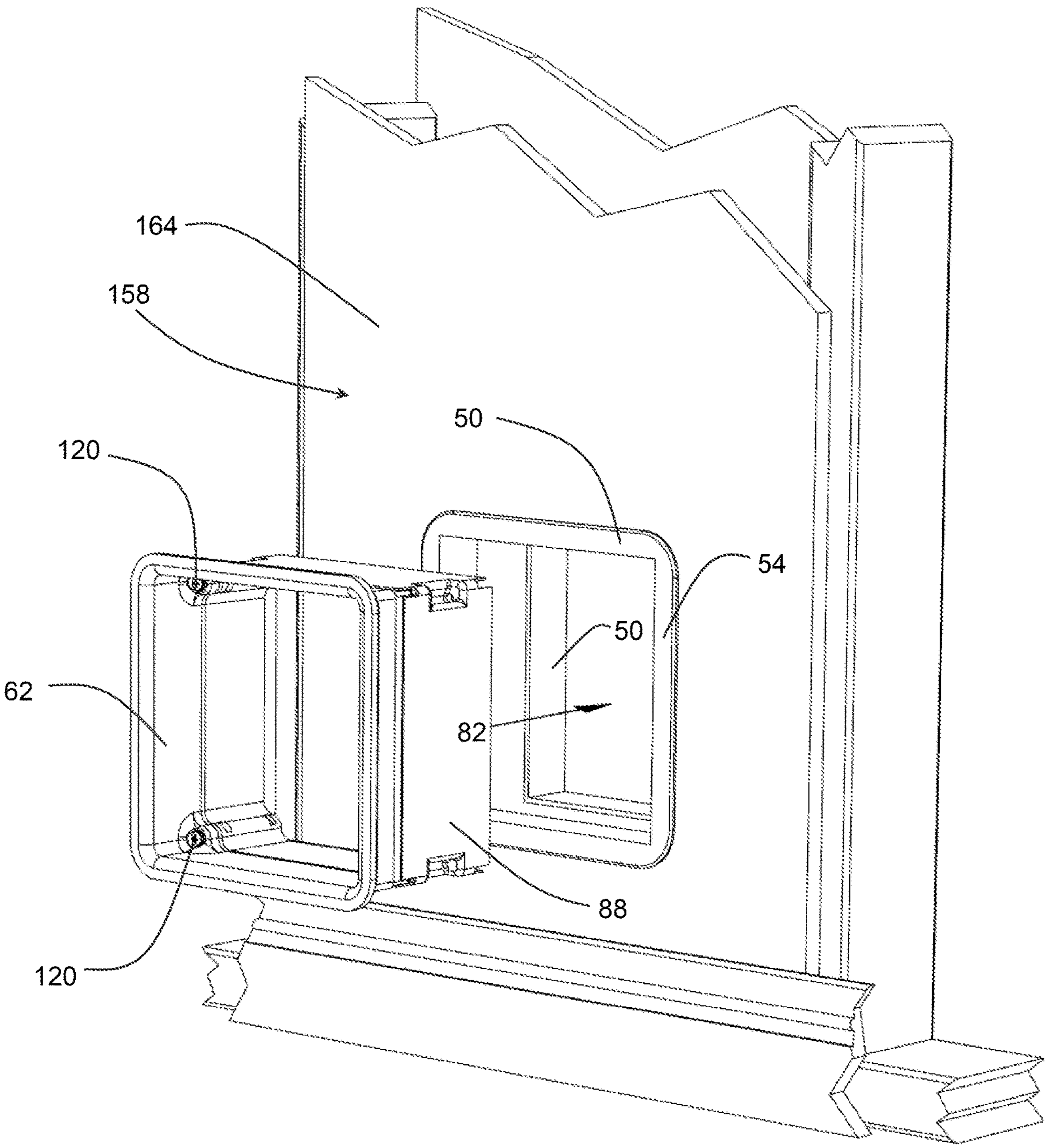
FIG. 8 schematically represents a side perspective view of a portion of the pet access tunnel of FIG. 5 to be installed in the wall system.

FIG. 8 schematically depicts the interior flanges 50 installed into the wallboards 164 on both sides of the wall system 158. The interior flanges 50 on sides A and B are placed in the openings 172 so that rims 54 of the interior flanges 50 abut the wall. The door flange 62 and the wall spacer 88 are connected such that the door flange 62 engages the first side receiving flanges 116 with the second ledge 72 extending about the central opening 82 of the door flange 62. Additionally, fasteners 120 are placed in the attachment bores 86 and 114 of the door flange 50 and wall spacer 88.

Figure 9:
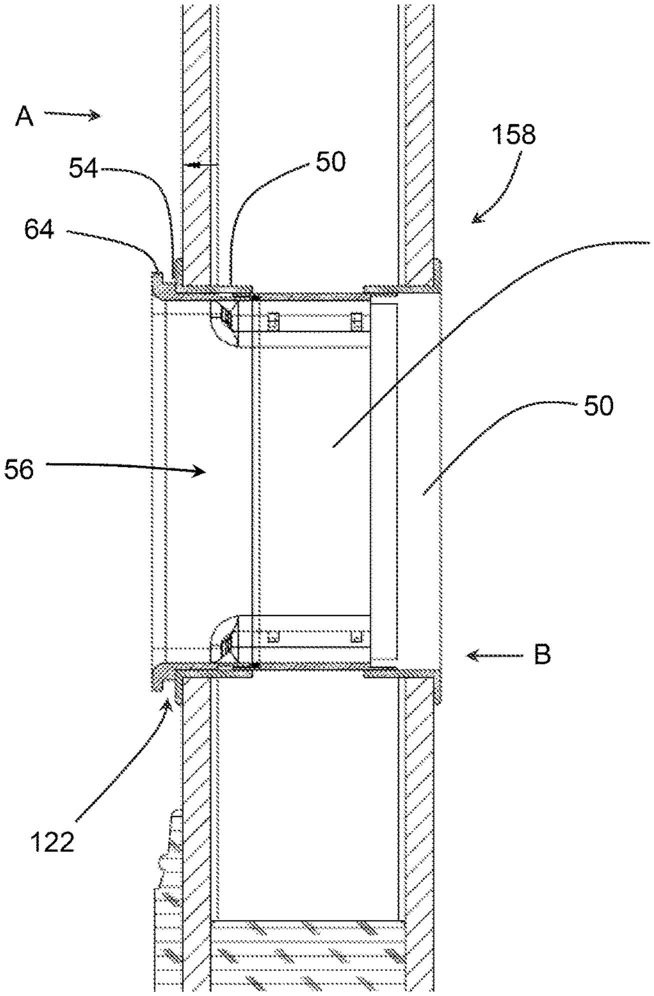
FIG. 9 schematically represents a sectioned side view of a portion of the pet access tunnel depicted in FIG. 6 installed in the wall system.
Figure 10:
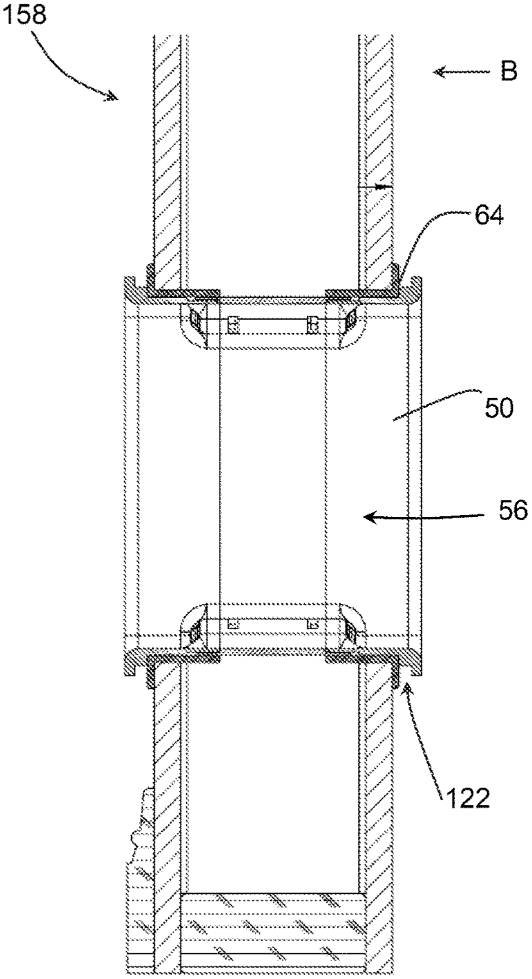
FIG. 10 schematically represents a sectioned side view of the pet access tunnel installed in the wall system.

FIGS. 9 and 10 schematically depict a sectioned view of the pet access tunnel being installed within the wall system 158. In FIG. 9, the door flange 62 and the wall spacer 88 are inserted within the central opening 56 of the interior flange 50 at side A of the wall system 158 so that the rim 66 of the door flange 62 abuts the rim 54 of the interior flange 50. The lip 64 of the door flange 62 is spaced from the rim 54 of the interior flange 50, forming a channel 122. In FIG. 10, a second door flange 62 is installed within the central opening 56 of a second interior flange 50 at the second side, side B, of the wall system 158. The rim 66 of the door flange 62 abuts the rim 54 of the second interior flange 50. The lip 64 of the door flange 50 is spaced from the rim 54 of the second interior flange 50, forming a channel 122.

Figure 11B:
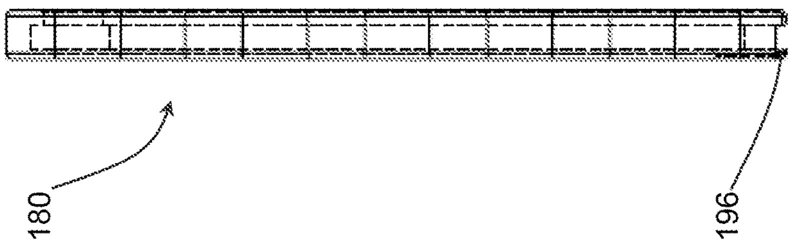
FIGS. 11A and 11B schematically represent front and side views, respectively, of a door as a component of the pet access tunnel.
Figure 11A:
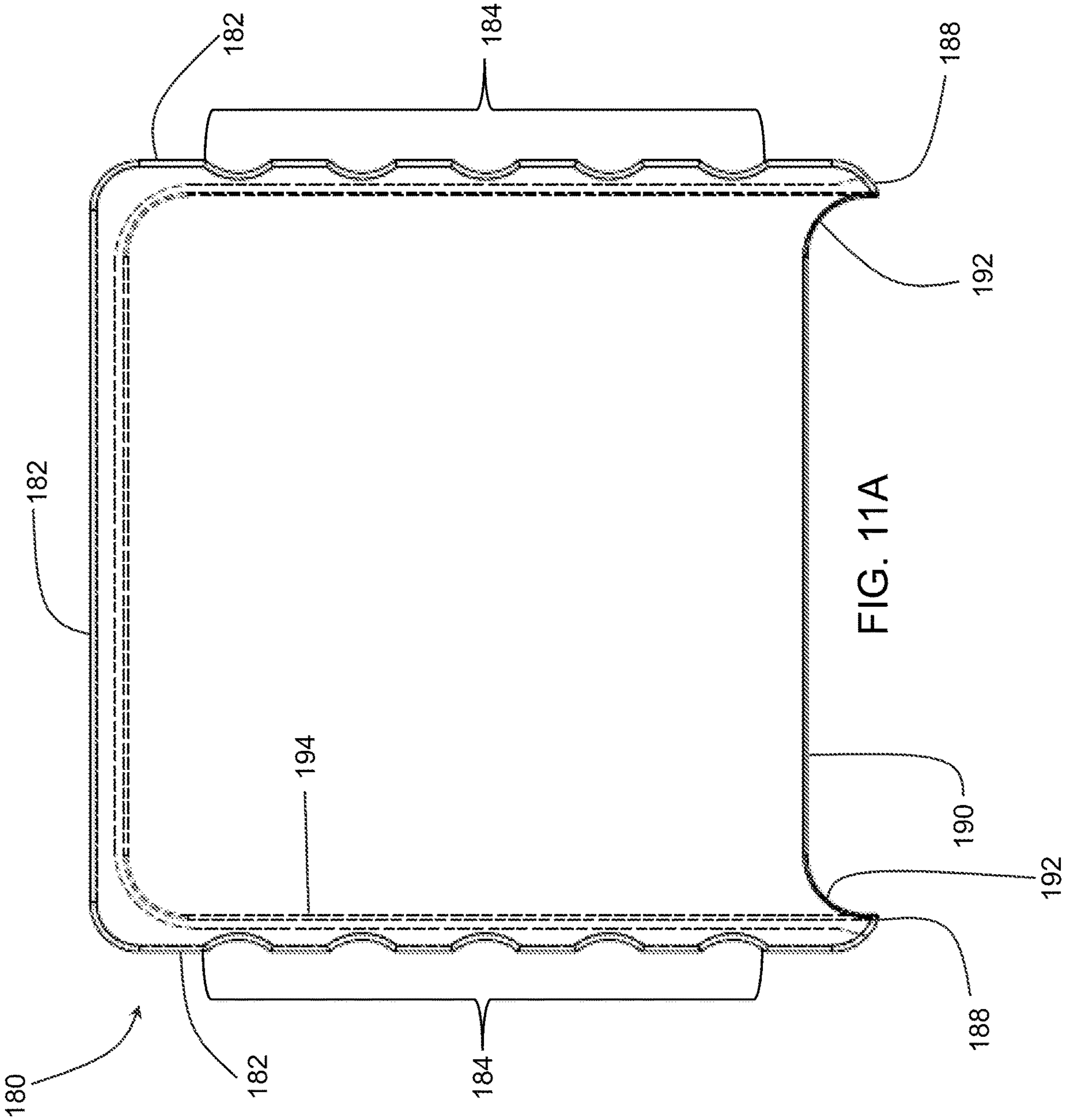

FIGS. 11A and 11B schematically represent a door 180. The door 180 includes a sidewall 182 that extends about three sides of the door 180. Grips 184 are included on two of the side walls 182 for assisting in operating the door 180. A bottom 188 of the door 180 includes a cutout 190. The cut out 190 includes two radiuses 192 that are configured to correspond to the sidewall 78 of the door flange 62. Depicted in FIG. 11A as dashed lines, a guide 194 extends from the sidewall 183 interior to the door 180. The guide 194 is configured to engage with the channel 120 of the internal flange 50 and door flange 62.

Figure 13:
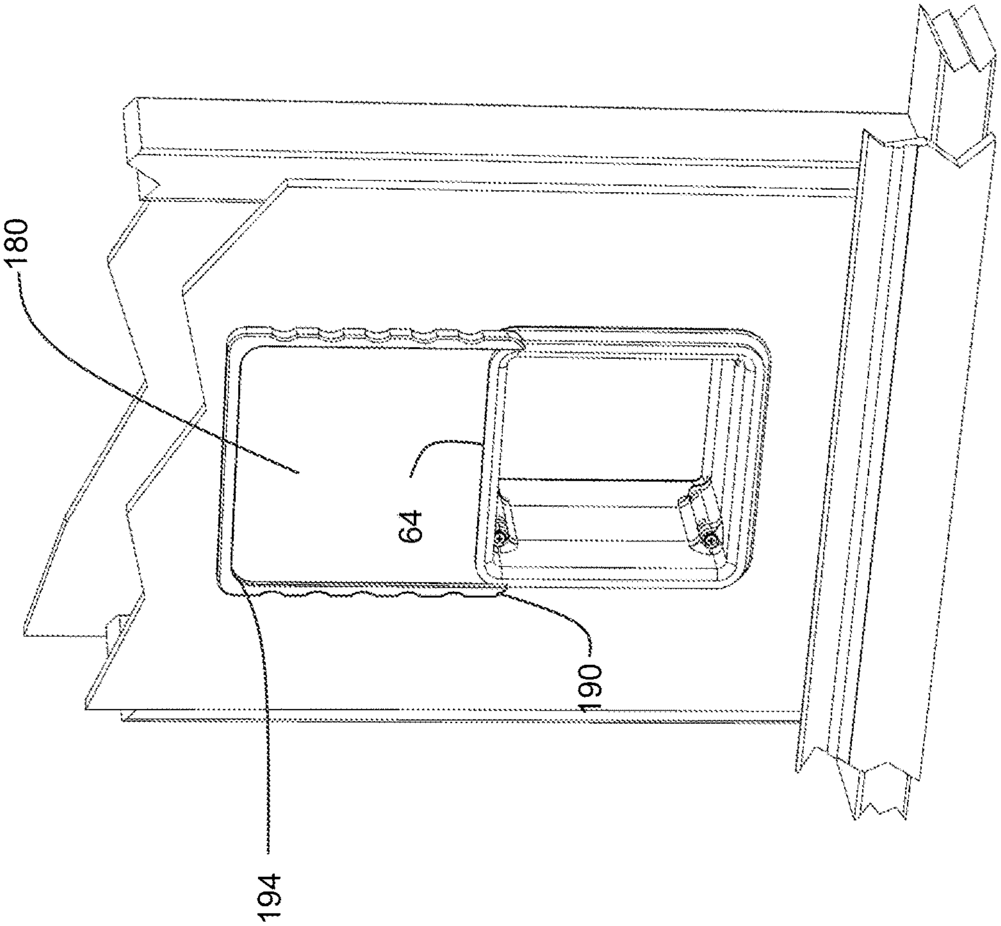
FIG. 13 schematically represents the door of FIGS. 11A and 11B in a stored position.
Figure 12:
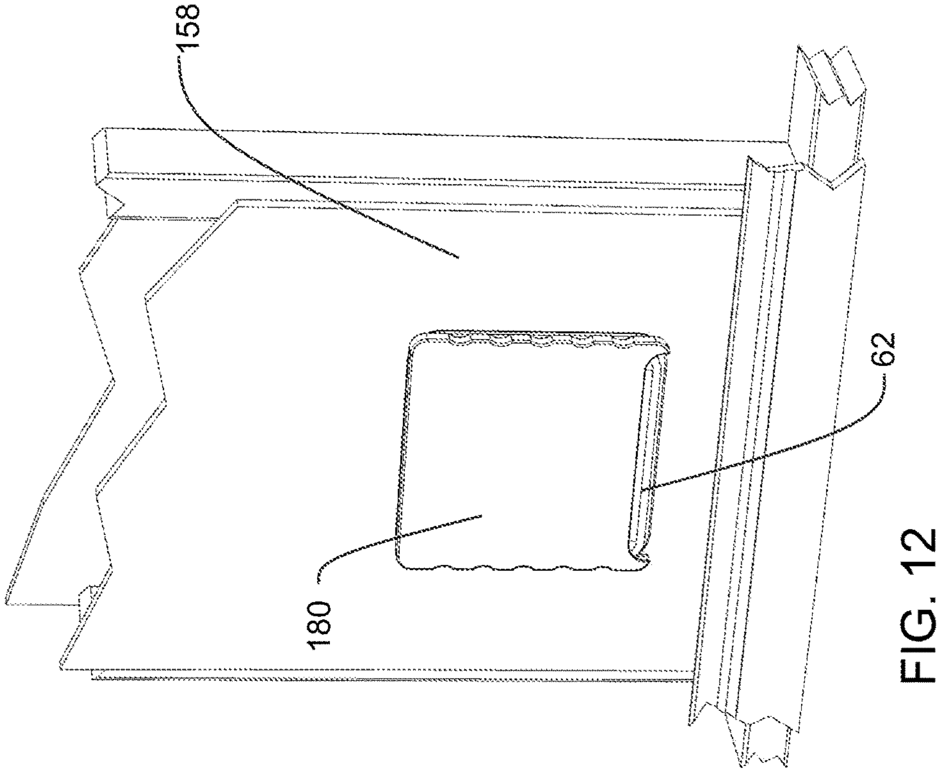
FIG. 12 schematically represents the door of FIGS. 11A and 11B installed.

FIGS. 12 and 13 schematically depict the door 180 in connection with door flange 62 of the pet access tunnel installed within the wall system 158. In FIG. 12, the door is movably mounted to the door flange 50 and in a closed position covering access to the pet access tunnel. In FIG. 13, the door 180 cutout 190 are engaged in the channel 122 formed by the lip 64 of the door flange 50 being spaced from the rim 54 of the interior flange 50 (as shown in FIG. 9).

Figure 14A:
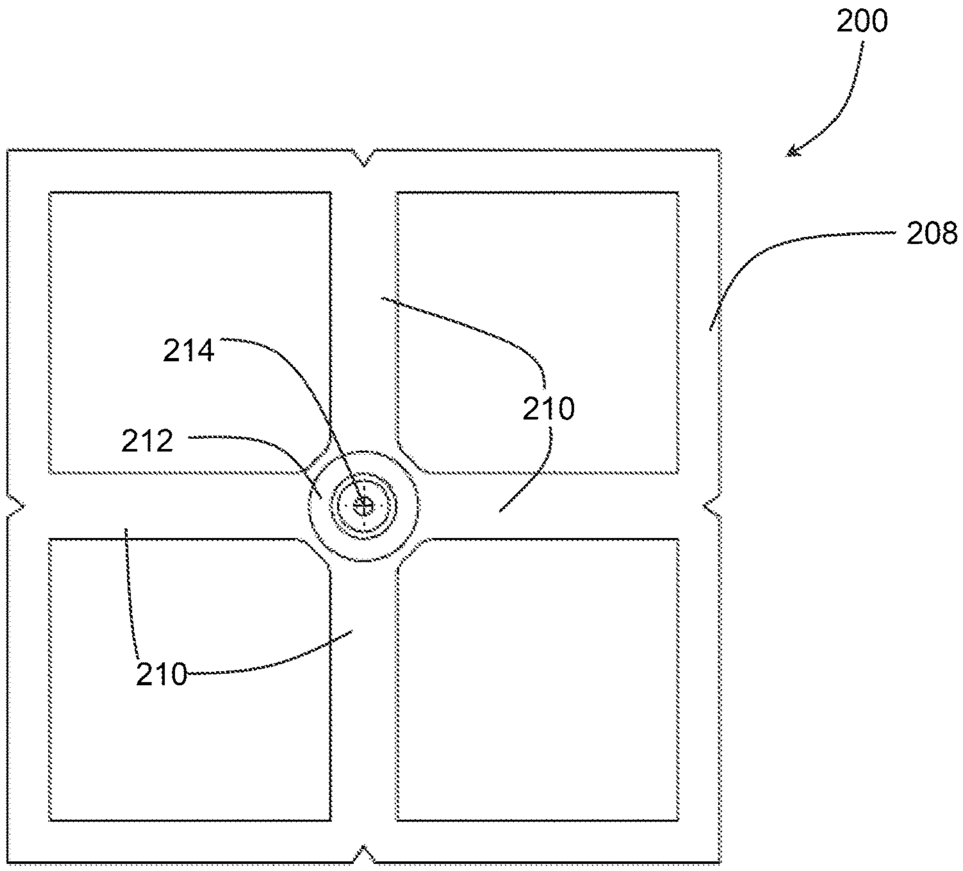
FIGS. 14A and 14B schematically represent front and side views, respectively, of an instillation kit as a component of the pet access tunnel.
Figure 14B:
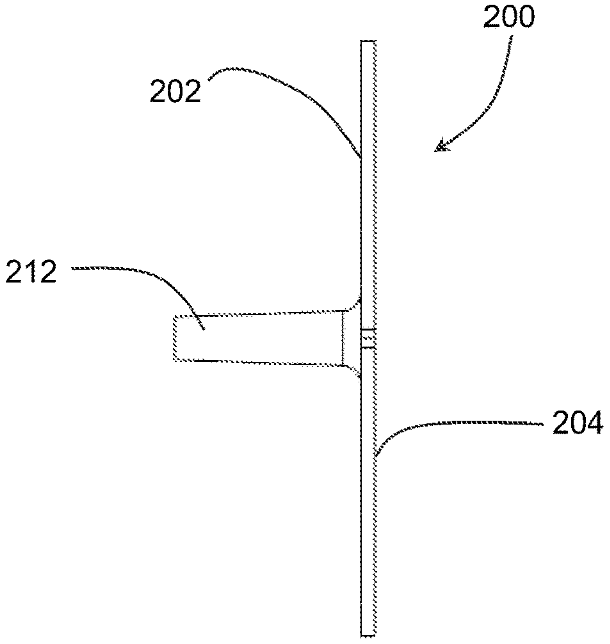

FIGS. 14A and 14B schematically represent a template installation kit 200. The template 200 includes a first side 202 and a second side 204. The template 200 includes a rectangular outer frame 208 with internal cross supports 210. An alignment post 212 is located at a center of the cross supports 210. The alignment post 212 extends out from the template 200 and includes an alignment hole 214 that extends through the alignment post 212.

Figure 15:
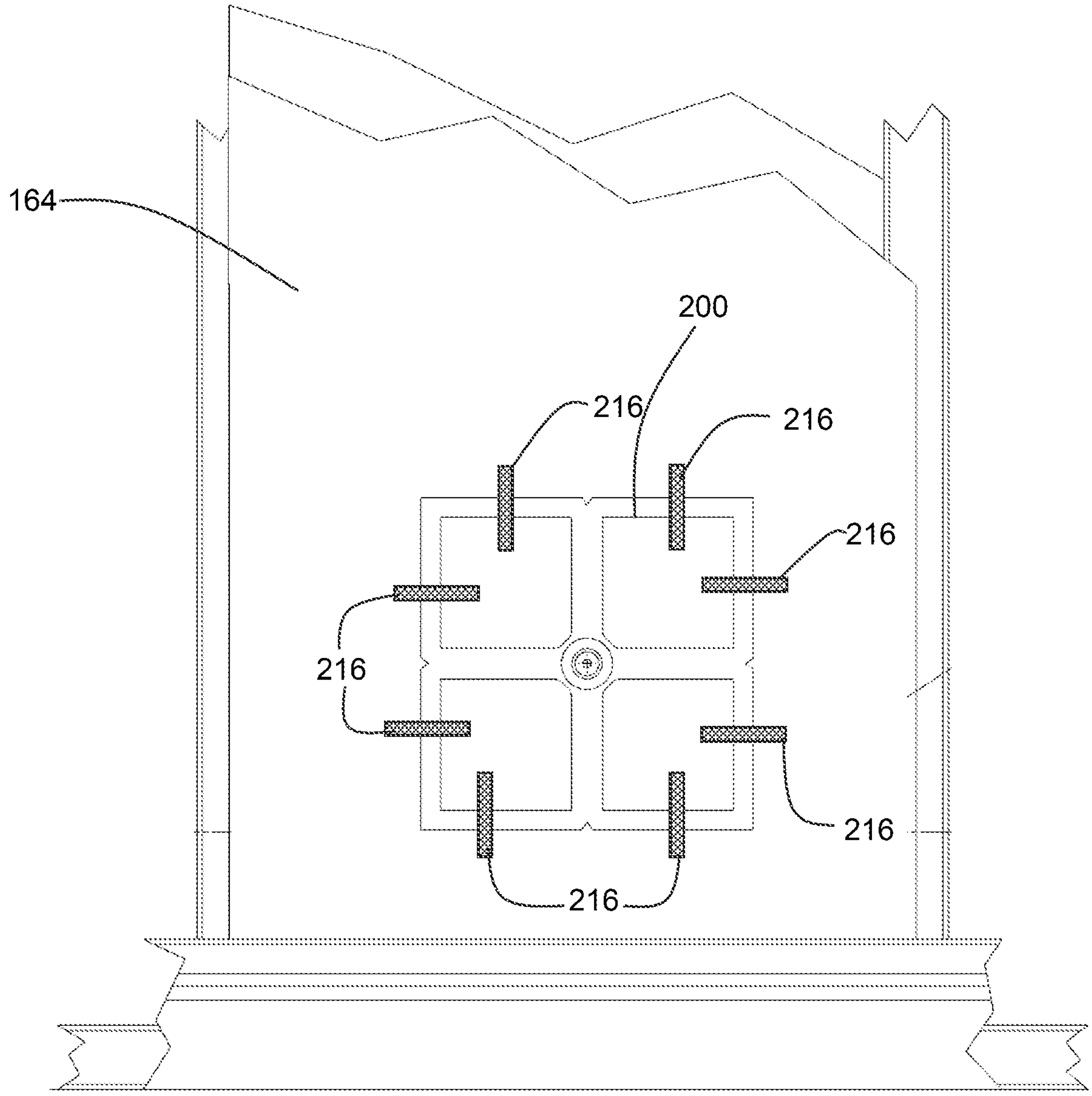
FIG. 15 schematically represents a front view of the kit of FIGS. 14A and 14B placed on the wall system.

FIG. 15 schematically depicts using the installation kit 200 to install the pet access tunnel. The template 200 is applied to the side of the wallboard 164 to identify a boundary of the wall opening 172 and create an inspection hole in the wallboard 164. The template may be temporarily secured to the wallboard 164 with tape 216. A user may then use the template to mark the square cutout for form the opening 172.

Figures 16A, 16B, 16C:
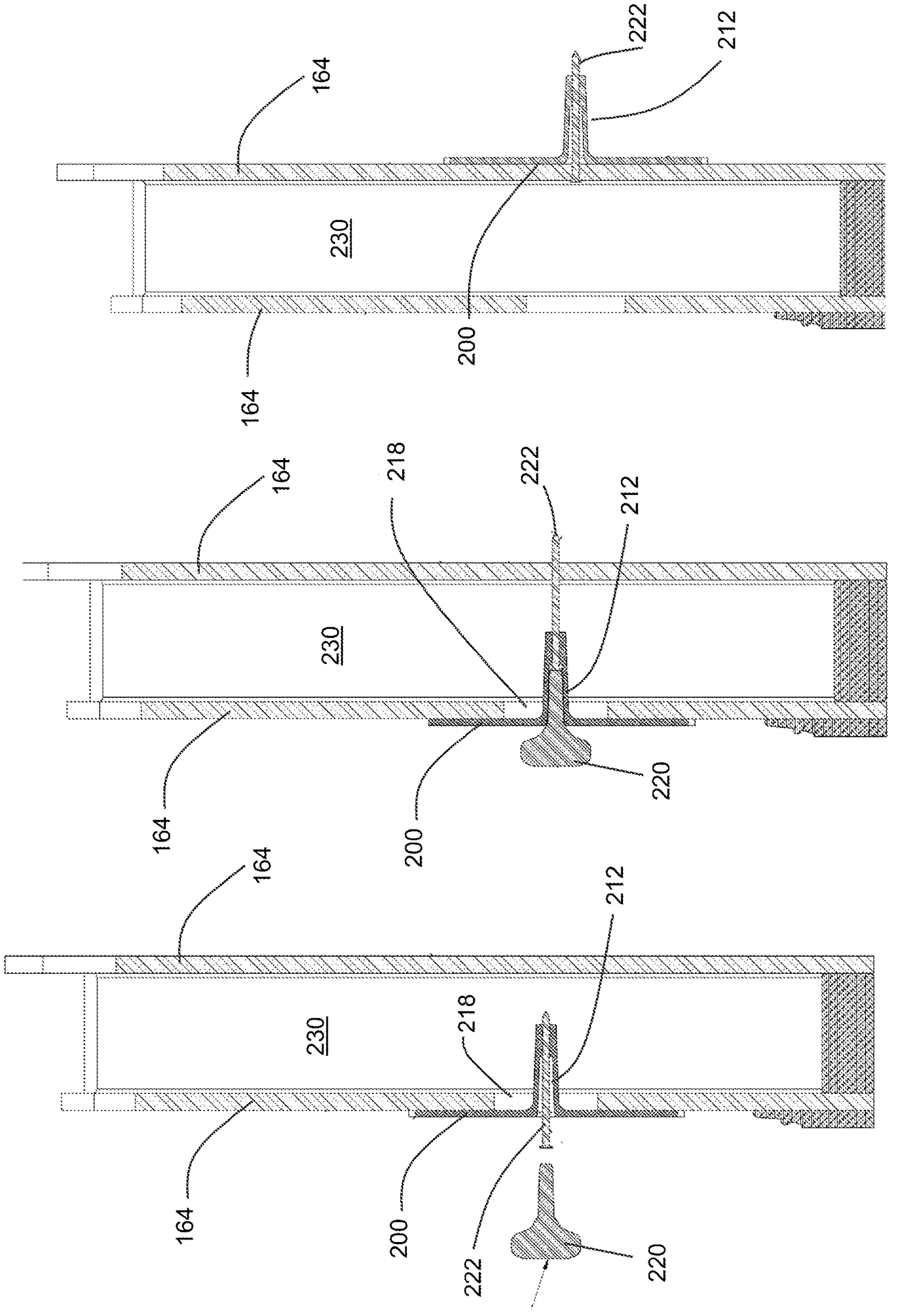
FIGS. 16A-16C schematically represent a side view of the kit of FIGS. 14A and 14B and steps of using the kit.

FIGS. 16A through 16C depict the steps of using the template 200 to transfer the opening 172 to the second side of the wallboard 164. An inspection hole 218 is created in the first side of the wallboard 164. Assuming no obstructions exist within the wall cavity 230, the alignment post 212 of the template 200 is placed into the inspection hole 218. A nail 222 is placed into the alignment hole 218. Using a push tool 220, the nail 222 is pushed through the alignment post 212 and into and through the opposite wallboard 164. The template 200 is then removed from the inspection hole 218 and the alignment post 212 is placed over the exposed nail 222. Using the alignment hole 218, a user is able to align the template at the second side of the wallboard 164 and identify a boundary of the wall opening 172 at the second side of the wallboard 164. Wall openings 172 can then be formed by cutting first and second wall holes 172 at the first and second sides of the wallboard 164 along the boundaries of the wall opening 172 identified at the first and second sides of the wallboard 164. The pet access tunnel as set forth above may then be installed within the wall system 158.

As previously noted above, though the foregoing detailed description describes certain aspects of one or more particular embodiments of the invention, alternatives could be adopted by one skilled in the art. For example, the pet access tunnel and its components could differ in appearance and construction from the embodiments described herein and shown in the drawings, functions of certain components of the pet access tunnel could be performed by components of different construction but capable of a similar (though not necessarily equivalent) function, and various materials could be used in the fabrication of the pet access tunnel and/or its components. As such, and again as was previously noted, it should be understood that the invention is not necessarily limited to any particular embodiment described herein or illustrated in the drawings.

The invention claimed is:

1. A pet access tunnel configured to be installed in and through a wall, the pet access tunnel comprising:

a first interior flange configured to be installed in a wall opening through the wall at a first side of the wall, the first interior flange having a central opening surrounded by a rim that is configured to abut the first side of the wall when the first interior flange is installed in the wall opening from the first side of the wall;

a second interior flange configured to be installed in the wall opening through the wall at a second side of the wall, the second interior flange having a central opening surrounded by a rim that is configured to abut the second side of the wall when the second interior flange is installed in the wall opening from the second side of the wall;

a first door flange configured to be installed in the central opening of the first interior flange, the first door flange having a central opening surrounded by a rim that is configured to abut the rim of the first interior flange when the first door flange is installed in the central opening of the first interior flange, a lip adjacent to the rim of the first door flange and extending around the central opening of the first door flange, and a ledge adjacent the rim of the first door flange opposite of the lip of the first door flange and extending around the central opening of the first door flange;

a second door flange configured to be installed in the central opening of the second interior flange, the second door flange having a central opening surrounded by a rim that is configured to abut the rim of the second interior flange when the second door flange is installed in the central opening of the second interior flange, a lip adjacent to the rim of the second door flange and extending around the central opening of the second door flange, and a ledge adjacent the rim of the second door flange opposite of the lip of the second door flange and extending around the central opening of the second door flange;

a wall spacer having a central opening and configured to be coupled to the first and second door flanges so that axial ends of the wall spacer overlap each of the ledges of the first and second door flanges; and at least one door movably mounted to at least one of the first and second door flanges.

2. The pet access tunnel of claim 1, further comprising fasteners for coupling the wall spacer to the first and second door flanges.

3. The pet access tunnel of claim 1, wherein the first and second door flanges each further comprise interior tabs within the central openings thereof, the interior tabs being adapted to couple the wall spacer to the first and second door flanges.

4. The pet access tunnel of claim 3, wherein the interior tabs of the first and second door flanges are within the central openings of the first and second door flanges adjacent axial ends of the first and second door flanges that are oppositely disposed from the rims of the first and second door flanges.

5. The pet access tunnel of claim 4, wherein the wall spacer has at least one interior tab at each of the axial ends thereof, and the interior tabs of the wall spacer abut the interior tabs of the first and second door flanges when the wall spacer is coupled to the first and second door flanges.

6. The pet access tunnel of claim 1, wherein the central opening of the wall spacer is planar with the central openings of the first and second door flanges.

7. The pet access tunnel of claim 1, further comprising flange spacers disposed between the axial ends of the wall spacer and the first and second door flanges to space the axial ends of the wall spacer from the first and second door flanges.

8. The pet access tunnel of claim 1, wherein the lip of the first door flange is configured to be spaced from the rim of the first interior flange when the first door flange is coupled to the first interior flange forming a channel.

9. The pet access tunnel of claim 8, wherein the at least one door includes a guide configured to slidably engage the channel formed when first door flange is coupled to the first interior flange.

10. The pet access tunnel of claim 9, wherein the door includes a wall including a cutout with radiused corners, wherein the wall and cutout are configured to engage the channel in order to place the door in a storage position.

* * * * *